US012698817B2

(12) United States Patent
Lee et al.

(10) Patent No.: US 12,698,817 B2
(45) Date of Patent: Aug. 4, 2026

(54) ELECTRONICALLY CONTROLLED INTERNAL DAMPER

(71) Applicant: HL MANDO CORPORATION, Pyeongtaek-si (KR)

(72) Inventors: Jongsun Lee, Yongin-si (KR); Wonbeen Im, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 705 days.

(21) Appl. No.: 18/100,819

(22) Filed: Jan. 24, 2023

(65) Prior Publication Data

US 2023/0235808 A1 Jul. 27, 2023

(30) Foreign Application Priority Data

Jan. 27, 2022 (KR) ........................ 10-2022-0012391

(51) Int. Cl.
  *F16F 9/46* (2006.01)
  *F16F 9/19* (2006.01)
  *F16F 9/48* (2006.01)
(52) U.S. Cl.
  CPC ............... *F16F 9/465* (2013.01); *F16F 9/19* (2013.01); *F16F 9/48* (2013.01); *F16F 2230/18* (2013.01)
(58) Field of Classification Search
  CPC ........ F16F 9/19; F16F 9/34; F16F 9/46; F16F 9/48; F16F 9/446; F16F 9/464;
  (Continued)

(56) References Cited

U.S. PATENT DOCUMENTS 5,168,965 A 12/1992 Huang
6,003,644 A 12/1999 Tanaka
  (Continued)

FOREIGN PATENT DOCUMENTS

CN 101387311 A 3/2009
CN 104214263 A 12/2014
  (Continued)

OTHER PUBLICATIONS

Office Action issued on Mar. 18, 2026, for corresponding German Patent Application No. 102023102077.3., along with an English machine translation (38 pages).
  (Continued)

*Primary Examiner* — Robert A. Siconolfi
*Assistant Examiner* — San M Aung
(74) *Attorney, Agent, or Firm* — Hauptman Ham, LLP

(57) ABSTRACT

An electronically controlled internal damper includes an outer housing reciprocated in a cylinder and partitioning the cylinder into an upper chamber and a lower chamber, an inner housing disposed inside the outer housing and forming a main flow path which makes the upper chamber and the lower chamber of the cylinder communicate with each other, a main poppet disposed in the inner housing to be movable up and down, thus opening or closing the main flow path, a pilot poppet configured such that at least a portion thereof is accommodated in an upper portion of the main poppet and adjusting an opening force of the main flow path according to a control current applied to a valve, and a soft valve coupled to a lower portion of the outer housing.

13 Claims, 5 Drawing Sheets

(58) Field of Classification Search
CPC ........ F16F 9/465; F16F 9/537; F16F 2230/18;
F16K 17/0406
USPC ..................................................... 188/322.15
See application file for complete search history.

(56) References Cited

U.S. PATENT DOCUMENTS

| | | | | |
|---|---|---|---|---|
| 2007/0209892 A1* | 9/2007 | Masamura | .............. | F16F 9/465 |
| | | | | 188/266 |
| 2013/0341141 A1* | 12/2013 | Heyn | ........................ | F16F 9/34 |
| | | | | 188/322.13 |
| 2017/0219042 A1* | 8/2017 | Callies | ...................... | F16F 9/34 |
| 2019/0032743 A1 | 1/2019 | Sakai | | |
| 2019/0309818 A1* | 10/2019 | Asshoff | ................... | F16F 9/461 |
| 2021/0012939 A1* | 1/2021 | Kamakura | .............. | F16F 9/469 |

FOREIGN PATENT DOCUMENTS

| | | |
|---|---|---|
| CN | 113613915 A | 11/2021 |
| CN | 214945997 U | 11/2021 |
| DE | 10 2012 210 458 B3 | 9/2013 |
| DE | 10 2013 218 658 A1 | 3/2015 |
| DE | 10 2019 214 973 B3 | 2/2021 |
| DE | 11 2020 001 540 T5 | 12/2021 |
| KR | 10-2021-0000487 A | 1/2021 |
| KR | 10-2023-0000312 A | 1/2023 |

OTHER PUBLICATIONS

Office Action issued on Mar. 26, 2026, for corresponding Chinese
Patent Application No. 202310042923.2., along with an English
machine translation (17 pages).

* cited by examiner

ELECTRONICALLY CONTROLLED INTERNAL DAMPER

CROSS-REFERENCE TO RELATED APPLICATION

This application claims the benefit of priority to Korean Patent Application No. 10-2022-0012391, filed on Jan. 27, 2022 in the Korean Intellectual Property Office, the entire content of which is incorporated herein by reference.

TECHNICAL FIELD

The present disclosure relates to an electronically controlled internal damper.

BACKGROUND

A conventional electronically controlled internal damper is configured such that a spool position is shifted according to a current to change the size of an orifice introduced into a pilot chamber and thereby vary a damping force.

Such a structure is problematic in that a fixed orifice size is changed according to a current, so that a damping force is rapidly increased according to a flow rate.

Since the spool should be smoothly moved, precision processing is required and thus a product cost is expensive. This is vulnerable to foreign substances and requires a separate process for adjusting the initial position of the spool.

SUMMARY

Accordingly, the present disclosure has been made keeping in mind the above problems occurring in the related art, and an objective of the present disclosure is to provide an electronically controlled internal damper which is easy to perform assembly and control a damping force.

The present disclosure provides an electronically controlled internal damper including an outer housing reciprocated in a cylinder and partitioning the cylinder into an upper chamber and a lower chamber, an inner housing disposed inside the outer housing and forming a main flow path which makes the upper chamber and the lower chamber of the cylinder communicate with each other, a main poppet disposed in the inner housing to be movable up and down, thus opening or closing the main flow path, a pilot poppet configured such that at least a portion thereof is accommodated in an upper portion of the main poppet and adjusting an opening force of the main flow path according to a control current applied to a valve, and a soft valve coupled to a lower portion of the outer housing.

Preferably, a main spring elastically supporting the main poppet downwards may be included.

Preferably, the main flow path may be formed along an outer through hole formed in the outer housing and a first inner through hole formed at a height corresponding to that of the outer through hole in the inner housing, and may be opened or closed depending on pressure at which the working fluid pushes the main poppet upwards.

Preferably, a tension pilot chamber may be formed between an inner circumference of the inner housing and a side of the main poppet, and the opening force of the main flow path may be adjusted as the pilot poppet is moved up and down according to the control current, in a tension stroke.

Preferably, a compression pilot chamber may be formed in an upper portion of the pilot poppet, and the opening force of the main flow path may be adjusted by at least one of a force supported by the main spring and a force supported by the pilot poppet according to the control current, in a compression stroke.

Preferably, a pilot spring disposed between the valve and the pilot poppet to elastically support the pilot poppet downwards may be included.

Preferably, the main poppet may include a main poppet body in which an accommodating portion for accommodating the pilot poppet and a main-poppet flow path portion for defining a pilot flow path are formed, a main poppet jacket which extends from a lower end of the main poppet body to contact the inner circumference of the inner housing, and a working-fluid acting portion which is pressed by working fluid to open or close the main flow path.

Preferably, the main-poppet flow path portion may include a horizontal pilot flow path which communicates with the pilot chamber, a first vertical pilot flow path which is connected at a lower end thereof to the horizontal pilot flow path and is connected at an upper end thereof to the accommodating portion, and a second vertical pilot flow path which passes vertically through the main poppet body, and the first vertical pilot flow path may communicate with the second vertical pilot flow path by pushing the pilot poppet upwards.

Preferably, the pilot poppet may include a plunger-rod support portion on which an end of the plunger rod of the valve is seated, and a guide flow path which makes the first vertical pilot flow path and the second vertical pilot flow path communicate with each other.

Preferably, a step may be formed on the accommodating portion to protrude toward the pilot poppet along a circumference of an upper end of the first vertical pilot flow path.

Preferably, a press surface may be formed on a lower end of the pilot poppet such that upward pressure is exerted thereon by the working fluid in the tension stroke.

Preferably, the working-fluid acting portion may include a guide wall protruding downwards from the lower end of the main poppet, and a guide groove formed inside the guide wall in a radial direction thereof, an outer circumference of the guide wall may be pressed by the working fluid in the tension stroke, and the guide groove may be pressed by working fluid in the compression stroke.

Preferably, the outer circumference of the guide wall may be formed to slope upwards toward an outside in the radial direction.

Advantageous Effects

An electronically controlled internal damper valve structure according to various embodiments of the present disclosure is advantageous in that a poppet is applied to secure the linearity of a damping force for a current, thus improving stability.

Further, the present disclosure is advantageous in that power consumption is reduced through low current driving.

Furthermore, the present disclosure is advantageous in that cost is reduced by simplifying assembly.

DETAILED DESCRIPTION

Figure 1:
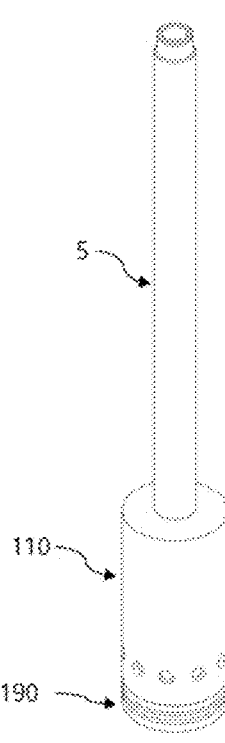
FIG. 1 is a diagram illustrating a state in which an outer housing is coupled to a piston rod in an electronically controlled internal damper according to various embodiments of the present disclosure.

Hereinafter, for the convenience of description, some embodiments of the present disclosure will be described with reference to the accompanying drawings. The same reference numerals are used throughout the drawings to designate the same or similar components.

The terminologies or words used in the specification and the claims should not be limited to common and dictionary meanings, but should be interpreted as having meanings and concepts which are defined within the scope of the present disclosure, as long as the inventor(s) can appropriately define the concepts of terminologies so as to explain he invention in the best way. Further, it will be understood that, although the terms "first", "second", "A", "B", "(a)", "(b)", etc. may be used herein to describe various elements, these elements should not be limited by these terms. These terms are only used to distinguish one element from another element. It will be understood that when an element is referred to as being "coupled" or "connected" to another element, it can be directly coupled or connected to the other element or intervening elements may be present therebetween.

Therefore, it is to be understood that the present description is not intended to limit the present disclosure to those exemplary embodiments, and the present disclosure is intended to cover not only the exemplary embodiments, but also various alternatives, modifications, equivalents and other embodiments that fall within the spirit and scope of the present disclosure. Further, the detailed descriptions of well-known functions and configurations that may unnecessarily obscure the subject matter of the present disclosure are omitted.

Hereinafter, an electronically controlled internal damper according to various embodiments of the present disclosure will be described in detail with reference to the accompanying drawings.

Figure 2:
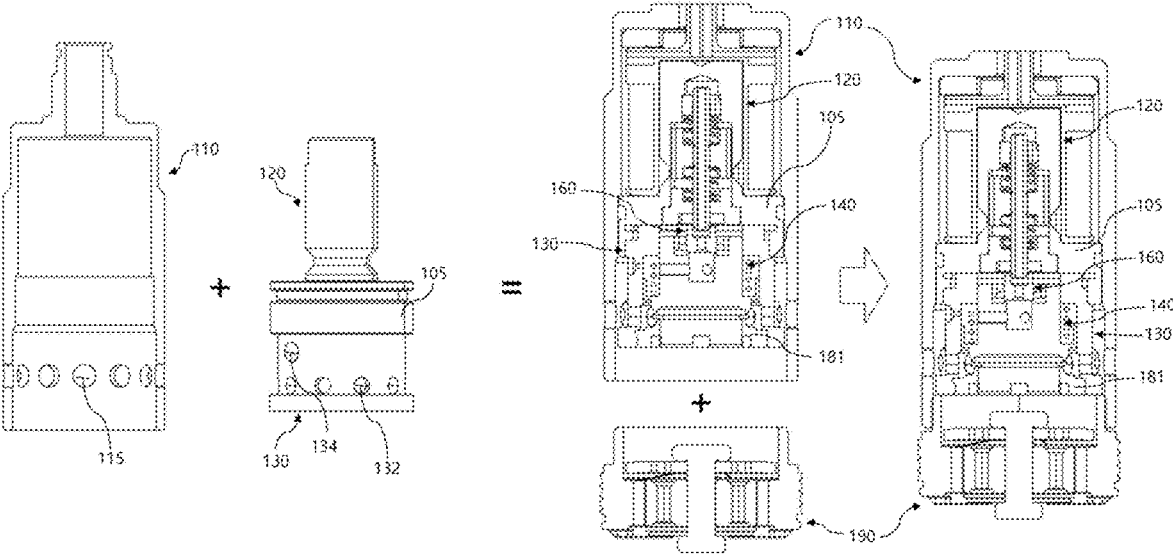
FIG. 2 is a diagram illustrating a fastening process of each component of the electronically controlled internal damper according to various embodiments of the present disclosure.
Figure 3:
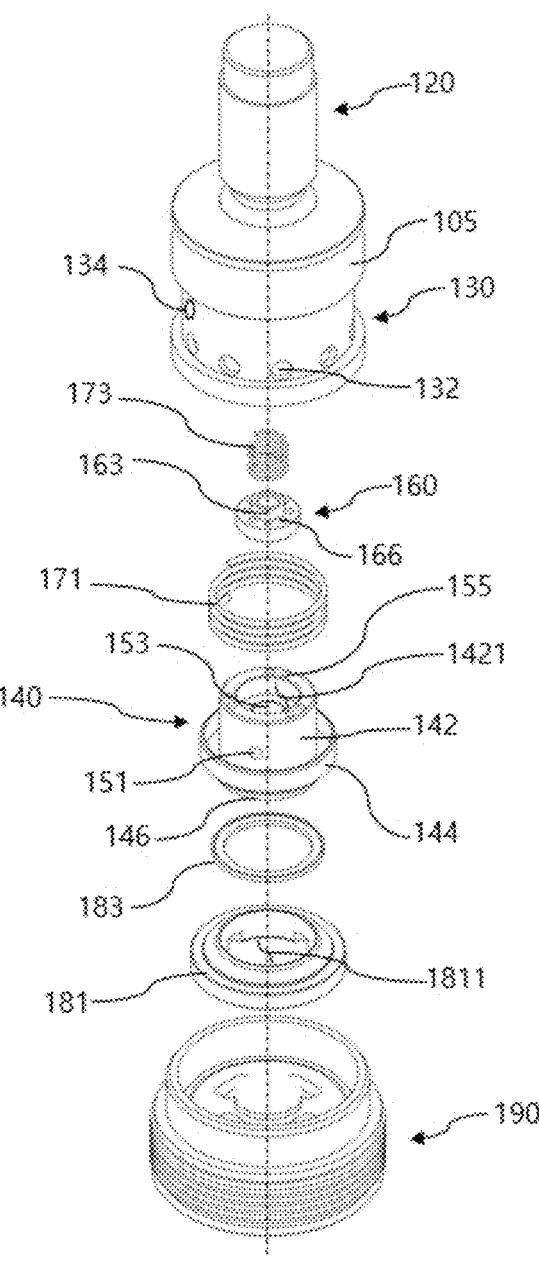
FIG. 3 is an exploded perspective view illustrating detailed components disposed inside an outer housing, in the fastening process of FIG. 2.
Figure 4:
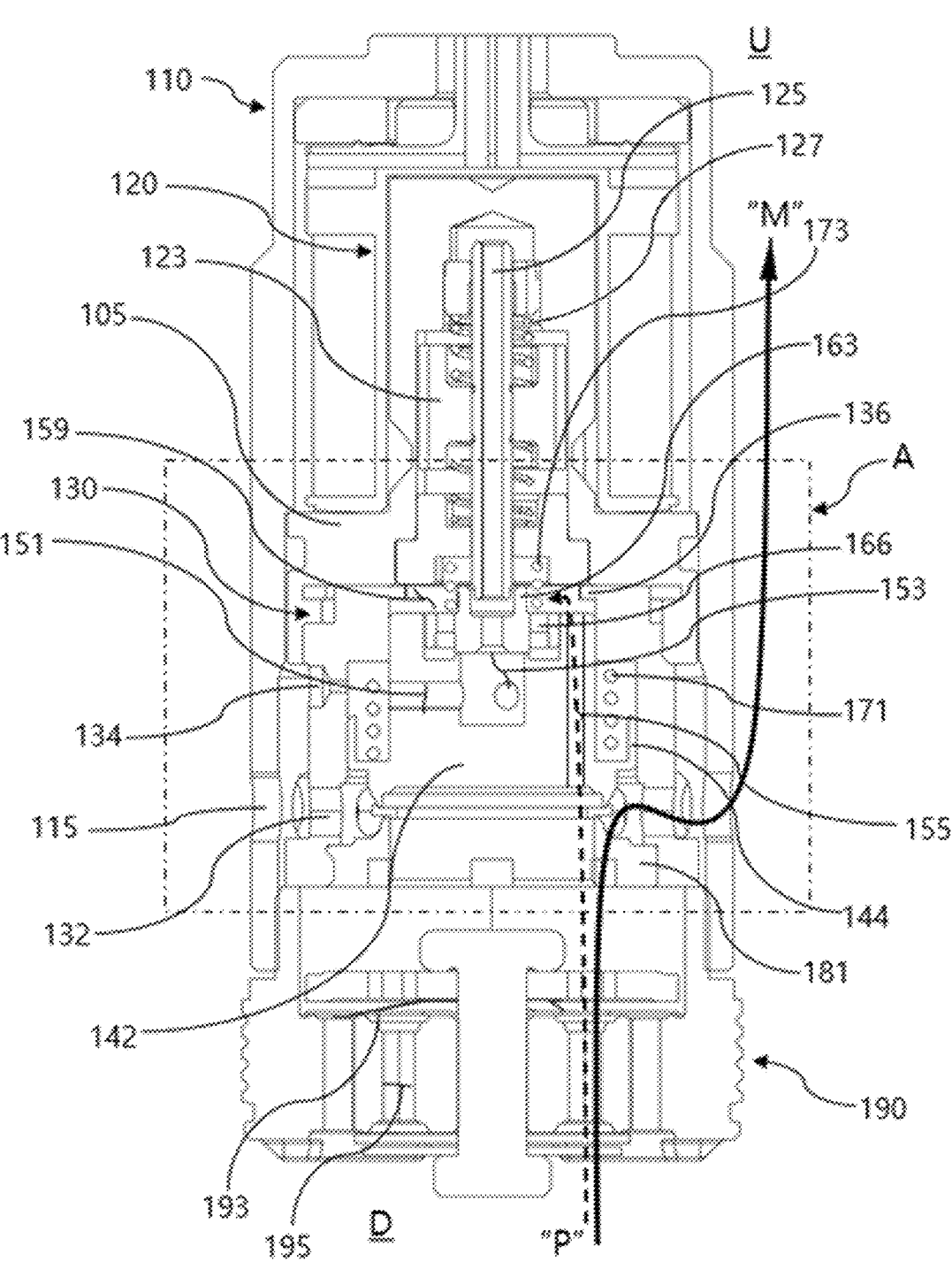
FIG. 4 is a diagram illustrating a flow path in a compression stroke along with an entire structure of the electronically controlled internal damper according to various embodiments of the present disclosure.
Figure 5:
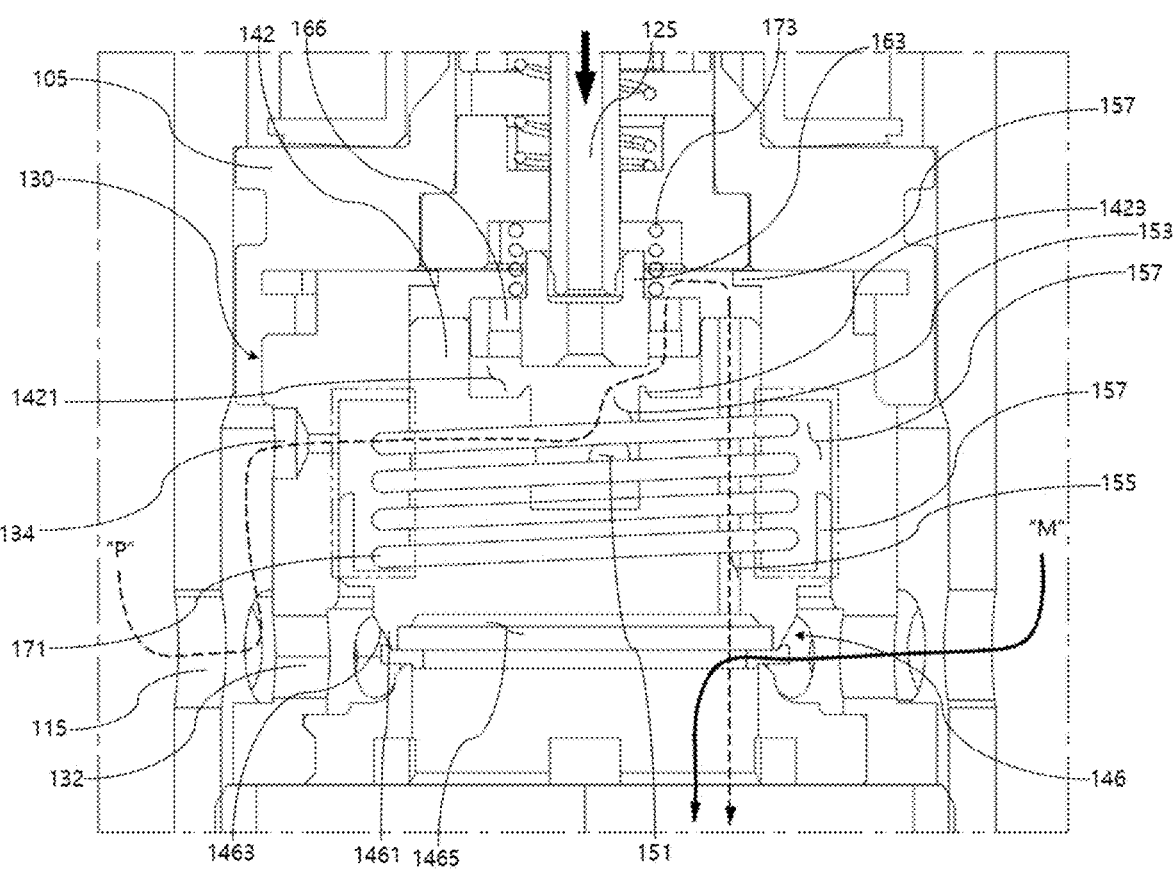
FIG. 5 is an enlarged view of area A of FIG. 4 along with a flow path in a tension stroke.

FIG. 1 is a diagram illustrating a state in which an outer housing is coupled to a piston rod in an electronically controlled internal damper according to various embodiments of the present disclosure, FIG. 2 is a diagram illustrating a fastening process of each component of the electronically controlled internal damper according to various embodiments of the present disclosure, FIG. 3 is an exploded perspective view illustrating detailed components disposed inside an outer housing in the fastening process of FIG. 2, FIG. 4 is a diagram illustrating a flow path in a compression stroke along with an entire structure of the electronically controlled internal damper according to various embodiments of the present disclosure, and FIG. 5 is an enlarged view of area A of FIG. 4 along with a flow path in a tension stroke.

Referring to FIGS. 1 to 5, the electronically controlled internal damper according to various embodiments of the present disclosure may include an outer housing 110, an inner housing 130, a main poppet 140, a main spring 171, a pilot poppet 160, a pilot spring 173, a solenoid valve 120, and a soft valve 190. The electronically controlled internal damper may further include a piston rod 5 to which the outer housing 110 is coupled, a control disc 183, and a main seat 181.

The electronically controlled internal damper according to the present disclosure separately forms pilot chambers depending on the tension stroke and the compression stroke, and controls the pressure of the pilot chamber according to each stroke, thus adjusting the opening force of a main flow path. In the present disclosure, the control of the hard damping force may be achieved by controlling the pressure of the pilot chamber, while the control of the soft damping force may be achieved by tuning the soft valve 190.

The electronically controlled internal damper according to various embodiments of the present disclosure may include the outer housing 110.

As shown in FIG. 1, the outer housing 110 may be coupled to an end of the piston rod 5 so that it is vertically reciprocated in a cylinder depending on compression or tension and partitions the interior of the cylinder into an upper chamber U and a lower chamber D. The outer housing 110 may be provided in the shape of a cylinder which defines a space therein and is opened at a bottom thereof.

Referring to FIGS. 2 and 3, the solenoid valve 120, the inner housing 130, the main poppet 140, the main spring 171, the pilot spring 173, the pilot poppet 160, the control disc 183, and the main seat 181 may be coaxially disposed in the internal space of the outer housing 110. The solenoid valve 120 may be coupled to the open lower end of the outer housing 110.

An outer through hole 115 through which working fluid flows in/out may be formed along the circumference of the side surface of the outer housing 110. The working fluid may flow between the upper chamber U and the lower chamber D of the cylinder through the flow path defined in the outer housing 110.

The solenoid valve 120 may be disposed at the uppermost position in the internal space of the outer housing 110. The solenoid valve 120 may include a coil 127, a plunger 123 provided to move downwards if a control current is applied to the coil 127, and a plunger rod 125. An end of the plunger rod 125 may be seated on a plunger-rod support portion 163 of the pilot poppet 160 which will be described later, and may press the pilot poppet 160 down according to the control current. In the present disclosure, the movement of the pilot poppet 160 may be controlled by adjusting the control current applied to the solenoid valve 120, so that the opening force of the main flow path may be adjusted. A compression pilot chamber 159 may be formed under the solenoid valve 120.

The inner housing 130 may be disposed under the solenoid valve 120. The inner housing 130 may be fixedly disposed in the outer housing 110 through an auxiliary mold. An internal space may be defined in the inner housing 130, and the pilot poppet 160, the main poppet 140, and the control disc 183 may be coaxially disposed in the internal space. The main seat 181 may be disposed on the lower end of the inner housing 130.

In an embodiment, the inner housing 130 may be opened at upper and lower portions thereof, and may be generally provided in the shape of a cylinder. The internal space of the inner housing 130 may be divided into an upper section in which the compression pilot chamber 159 is formed, and a lower section in which a tension pilot chamber 157 is formed. In an embodiment, a diameter of the lower section of the inner housing 130 may be formed to be larger than that of the upper section thereof. The upper section in the internal space of the inner housing 130 in which the compression pilot chamber 159 is formed may be formed with a diameter corresponding to that of a main poppet body 142 so that the main poppet body 142 is slidably accommodated. The lower section in the internal space of the inner housing 130 in which the tension pilot chamber 157 is formed may be formed with a diameter corresponding to that of a main poppet jacket 144 so that the main poppet jacket 144 is slid.

The main poppet 140 may be disposed in the inner housing 130 to be vertically movable. The pilot poppet 160 may be disposed in the upper section of the inner housing 130 to be vertically movable. The main seat 181 may be coupled to the lower end of the inner housing 130 to limit the downward movement of the main poppet 140, and the control disc 183 may be disposed between the main seat 181 and the main poppet 140. A guide step 136 may be formed on the upper end of the inner housing 130 to limit the upward movement of the main poppet 140.

A tension pilot chamber 157 may be formed between the inner circumference of the inner housing 130 and the main poppet body 142 in the lower section of the inner housing 130. A compression pilot chamber 159 may be formed between the main poppet 140 and the solenoid valve 120 in the upper section of the inner housing 130.

A first inner through hole 132 forming the main flow path and a second inner through hole 134 forming the tension pilot flow path may be formed in a side surface corresponding to the lower section of the inner housing 130. In an embodiment, the first inner through hole 132 may be formed at a height corresponding to the outer through hole 115 of the outer housing 110. Further, the second inner through hole 134 may be disposed on the side surface of the inner housing 130 to be located above the first inner through hole 132. In the tension stroke, working fluid in the upper chamber U may flow into the lower chamber D through the first inner through hole 132 and the second inner through hole 134. In the compression stroke, working fluid in the lower chamber D may flow out to the upper chamber U through the first inner through hole 132.

The main poppet 140 may be disposed in the inner housing 130 to be vertically movable, thus opening or closing the main flow path. In the present disclosure, the main flow path may be formed along the outer through hole 115 of the outer housing 110, the first inner through hole 132 of the inner housing 130, a hollow hole 1811 of the main seat 181, and a valve hole 195 of the soft valve 190. Among them, the main poppet 140 contacts the main seat 181 or the control disc 183 disposed on the main seat, so that the main flow path is closed. If the main poppet 140 is pushed up by the working fluid, it is spaced apart from the main seat 181 or the control disc 183 disposed on the main seat, so that the main flow path may be opened. In an exemplary embodiment, the upward movement of the main poppet 140 may be limited by the guide step 136 of the inner housing 130, while the downward movement may be limited by the main seat 181 or the control disc 183 disposed on the main seat.

The main poppet 140 may include a main poppet body 142, a main poppet jacket 144, and a working-fluid acting portion 146. The main poppet body 142 may be formed with a diameter corresponding to that of the upper section of the inner housing 130 to be slidable up and down on the inner circumference of the upper section of the inner housing 130. Since the lower section of the inner housing 130 is formed to have a diameter larger than that of the upper section, a space may be formed between the inner circumference of the lower section and the main poppet body 142, and the tension pilot chamber 157 may be formed in this space.

An accommodating portion 1421 which is concavely formed from an upper surface to accommodate the pilot poppet 160 may be formed in the main poppet body 142. At least a portion of the pilot poppet 160 may be accommodated inside the accommodating portion 1421 to be vertically movable. The outer circumference of the pilot poppet 160 may slide relative to the inner circumference of the accommodating portion 1421. The bottom surface of the accommodating portion 1421 may communicate with a first vertical pilot flow path 153 which will be described later. In an exemplary embodiment, a step 1423 may be formed on the bottom surface of the accommodating portion 1421 to protrude toward the pilot poppet 160 along the circumference of the upper end of the first vertical pilot flow path 153. In the present disclosure, the compression pilot chamber 159 may be formed in the upper section of the inner housing 130 between the main poppet body 142 and the solenoid valve 120.

A flow path portion of the main poppet 140 forming the pilot flow path may be formed inside the main poppet body 142. In an embodiment, the flow path portion of the main poppet 140 may include a horizontal pilot flow path 151 communicating with the tension pilot chamber 157, a first vertical pilot flow path 153 which is connected at a lower end thereof to the horizontal pilot flow path 151 and is connected at an upper end thereof to the accommodating portion 1421, and a second vertical pilot flow path 155 which passes vertically through the main poppet body 142.

In the tension stroke, a tension pilot flow path may be formed along the outer through hole 115 of the outer housing 110, the second inner through hole 134 of the inner housing 130, the tension pilot chamber 157, the horizontal pilot flow path 151, the first vertical pilot flow path 153, the second vertical pilot flow path 155, the hollow hole 1811 of the main seat 181, and the valve hole 195 of the soft valve 190.

On the other hand, in the compression stroke, a compression pilot flow path may be formed along the valve hole 195 of the soft valve 190, the hollow hole 1811 of the main seat 181, and the second vertical pilot flow path 155.

The main poppet jacket 144 may extend from the lower end of the main poppet body 142, may be formed to have a diameter corresponding to that of the lower section of the inner housing 130, and may be provided to slide up and down relative to the inner circumference of the lower section of the inner housing 130. Since the main poppet jacket 144 and the main poppet body 142 are spaced apart from each other in a radial direction due to a difference in diameter therebetween, the tension pilot chamber 157 may be formed using the space defined therebetween. Further, a main spring 171 may be disposed in the space between the main poppet jacket 144 and the main poppet body 142.

The working-fluid acting portion 146 may be formed in the lower end of the main poppet 140 to be pressed by working fluid. The working-fluid acting portion 146 may include a guide wall 1461 which protrudes downwards from the lower end of the main poppet 140, and a guide groove 1465 which is formed inside the guide wall 1461 in a radial direction thereof. In an exemplary embodiment, the outer circumference of the guide wall 1461 may be formed as an inclined plane 1463 which slopes upwards toward an outside in the radial direction.

According to the present disclosure, as will be described later, in the tension stroke, the outer circumference of the guide wall 1461 may be pressed toward an inside in the radial direction by the working fluid to push the main poppet 140 up. In the compression stroke, the guide groove 1465 may be pressed upwards by the working fluid to push the main poppet 140 up.

The main poppet 140 may be elastically supported downwards by the main spring 171. In an embodiment, the main spring 171 may be disposed such that a lower end thereof is supported by the main poppet jacket 144 and an upper end thereof is supported by the bottom of the upper section of the inner housing 130. In the present disclosure, a force by which the main spring 171 elastically supports the main poppet 140 may act as a force that counteracts a force by which the main poppet 140 is pushed up by the inflow of the working fluid.

The pilot poppet 160 may be disposed inside the accommodating portion 1421 formed in the main poppet body 142. The pilot poppet 160 may slide up and down relative to the inner circumference of the accommodating portion 1421. The pilot poppet 160 may be generally provided in the shape of a cylinder which has a diameter corresponding to that of the accommodating portion 1421.

The pilot poppet 160 may include a plunger-rod support portion 163 on which an end of the plunger rod 125 of the solenoid valve 120 is seated, and a guide flow path 166 which makes the first vertical pilot flow path 153 and the second vertical pilot flow path 155 communicate with each other. The plunger-rod support portion 163 may be formed in a central portion of the pilot poppet. The plunger-rod support portion 163 may protrude upwards, and the pilot spring 173 may be installed in the plunger-rod support portion 163 which protrudes as such. The guide flow path 166 may be formed on the outside of the plunger-rod support portion 163 in a radial direction thereof. The guide flow path 166 may be formed radially outside the step 1423 formed on the bottom surface of the accommodating portion 1421.

In the present disclosure, the pilot poppet 160 may serve as a valve which opens or blocks the flow of the pilot flow path. When the pilot poppet 160 moves downwards and the lower surface of the pilot poppet 160 contacts the step 1423 formed on the bottom surface of the accommodating portion 1421, the lower surface of the pilot poppet 160 may cover the first vertical pilot flow path 153 to block the flow of working fluid through the pilot flow path. When the pilot poppet 160 moves upwards so that the lower surface of the pilot poppet 160 is spaced apart from the step 1423, the flow of the working fluid through the pilot flow path may be opened.

The pilot poppet 160 may be moved downwards by the plunger rod 125 of the solenoid valve 120. The downward movement of the pilot poppet 160 may be adjusted according to the level of the control current applied to the solenoid valve 120. According to the present disclosure, in the tension stroke, the downward movement of the pilot poppet 160 may be controlled by controlling the level of the control current, so that the pressure of the tension pilot chamber 157 may be controlled. In the compression stroke, the pilot poppet 160 and the main poppet 140 may be pressed downwards by driving the solenoid valve 120 in a state where the lower surface of the pilot poppet 160 contacts the bottom surface of the accommodating portion 1421 of the main poppet 140, thus adjusting the pressure of the compression pilot chamber 159.

The lower surface of the plunger-rod support portion 163 of the pilot poppet 160 is formed to cover the first vertical pilot flow path 153 which communicates with the bottom surface of the accommodating portion 1421 of the main poppet 140. The lower surface of the plunger-rod support portion 163 of the pilot poppet 160 may be described as a press surface which is pressed upwards by working fluid introduced through the first vertical pilot flow path 153 in the tension stroke.

Meanwhile, the main seat 181 in which the hollow hole 1811 is formed may be coupled to the open lower end of the inner housing 130, and the ring-shaped control disc 183 may be disposed between the main seat 181 and the main poppet 140.

Further, the soft valve 190 may be coupled to the open lower end of the outer housing 110. The soft valve 190 may serve to perform the soft damping-force control in the electronically controlled internal damper according to various embodiments of the present disclosure. The soft valve 190 may have the valve hole 195 opened by pressure at which working fluid flows in or out. The valve hole 195 may be opened or closed by a plate-shaped valve 193 which closes the valve hole 195 with a preset elastic force. If the pressure by the working fluid is larger than the preset elastic force, the plate-shaped valve 193 may be opened, so that the working fluid may flow through the valve hole 195. According to an exemplary embodiment, the valve hole 195 and the plate-shaped valve 193 may be separately provided to form each flow path in the tension stroke and the compression stroke. At this time, the preset elastic force of the plate-shaped valve 193 may be individually set in the tension stroke and the compression stroke.

That is, according to the present disclosure, a relatively soft damping force may be adjusted by setting the elastic force of the plate-shaped valve 193 provided on the soft valve 190, and a relatively hard damping force may be adjusted by controlling the pressure of the pilot chamber with the movement amount of the pilot poppet 160 according to the control current of the solenoid valve 120 as described above.

Hereinafter, the method of controlling the hard damping force in the electronically controlled internal damper according to various embodiments of the present disclosure will be described in detail with reference to FIGS. 4 and 5.

In the present disclosure, the damping force of the damper may be adjusted according to the opening force of the main flow path. The opening force of the main flow path may be described as the resultant force of a force for pushing the main poppet 140 upwards by working fluid which flows along the main flow path and a force for pushing the main poppet 140 downwards.

According to various embodiments of the present disclosure, the force for pushing the main poppet 140 downwards may be applied differently during the tension stroke and the compression stroke.

In the tension stroke, the pressure of the tension pilot chamber 157 changed by the movement of the pilot poppet 160 may act as the force for pushing the main poppet 140 downwards.

Hereinafter, the opening force of the main flow path in the tension stroke will be described in detail with reference to FIG. 5.

Referring to FIG. 5, in the tension stroke, the working fluid in the upper chamber U of the cylinder may flow through the outer through hole 115 of the outer housing 110 and the first inner through hole 132 of the inner housing 130 to the side of the main poppet 140. The introduced working fluid exerts pressure on the working-fluid acting portion 146 formed on the lower end of the main poppet 140. Since the outer circumference of the working-fluid acting portion 146 is formed as the inclined plane 1463, the main poppet 140 may be pushed upwards by the pressure of the working fluid.

The working fluid flowing through the outer through hole 115 of the outer housing 110 may be introduced into the first inner through hole 132 of the inner housing 130 as well as the second inner through hole 134 communicating with the tension pilot chamber 157. The working fluid introduced through the second inner through hole 134 into the tension pilot chamber 157 flows along the horizontal pilot flow path 151 and the first vertical pilot flow path 153 of the main poppet 140 to press the press surface of the lower end of the pilot poppet 160 upwards. As the pilot poppet 160 is pushed upwards by the working fluid, a passage may be opened between the pilot poppet 160 and the main poppet 140, so that the working fluid may flow through the tension pilot flow path to the lower chamber D of the cylinder. At this time, a predetermined pressure may be generated in the tension pilot chamber 157 by the inflow of the working fluid.

Meanwhile, if the control current is applied to the solenoid valve 120, the pilot poppet 160 may be pressed by the plunger rod 125 of the solenoid valve 120 to be moved downwards, and the movement amount may be adjusted according to the level of the control current. According to the present disclosure, the downward movement amount of the pilot poppet 160 may be adjusted by controlling the level of the control current applied to the solenoid valve 120, so that the pressure of the tension pilot chamber 157 may be adjusted.

Therefore, according to the present disclosure, in the tension stroke, the damping force may be adjusted by adjusting the opening force of the main flow path under the control of the pressure of the tension pilot chamber 157 according to the control current applied to the solenoid valve 120.

Therefore, in the tension stroke, the resultant force of the pressure for pushing the main poppet 140 upwards by the working fluid and the pressure of the tension pilot chamber 157 varying depending on the movement of the pilot poppet 160 may act as the opening force of the main flow path.

In the tension stroke, the main flow path and the tension pilot flow path flow through the soft valve 190 into the lower chamber D of the cylinder.

Meanwhile, in the compression stroke, unlike the above-described tension stroke, at least one of the pressure of the compression pilot chamber 159, thrust applied by the driving of the solenoid valve 120, and the elastic force applied by the main spring 171 may act as the force for pushing the main poppet 140 downwards.

Hereinafter, the opening force of the main flow path will be described in detail in the compression stroke with reference to FIG. 4.

In the compression stroke, the working fluid in the lower chamber D of the cylinder may be introduced through the valve hole 195 of the soft valve 190. The introduced working fluid presses the guide groove 1465 of the main poppet 140, thus providing a force for pushing the main poppet 140 upwards. Simultaneously, the working fluid introduced into the valve hole 195 may flow along the second vertical pilot flow path 155 formed in the main poppet body 142 into the compression pilot flow path defined in the upper portion of the main poppet 140, thus forming the pressure of the compression pilot chamber 159. Since the diameter of the guide groove 1465 of the main poppet 140 is formed to be larger than that of the main poppet body 142, the pressure acting on the guide groove 1465 to push the main poppet 140 upwards may be larger than the pressure of the compression pilot chamber 159.

At this time, the pilot poppet 160 may be pushed downwards by the working fluid introduced into the compression pilot chamber 159 to block the first vertical pilot flow path 153, thereby blocking the flow of the working fluid.

Meanwhile, in this state, if the control current is applied to the solenoid valve 120, the plunger rod 125 of the solenoid valve 120 supports the pilot poppet 160 downwards. The force supported by the pilot poppet 160 according to the control current of the solenoid valve 120 also acts as the force for pushing the main poppet 140 downwards.

Further, according to the present disclosure, since the main poppet 140 is elastically supported by the main spring 171, the force supported by the main spring 171 also acts as the force for pushing the main poppet 140 downwards.

Therefore, according to the present disclosure, in the compression stroke, the opening force of the main flow path may be adjusted by the pressure of the compression pilot chamber 159, the downward pressure acting on the main poppet 140 according to the control current applied to the solenoid valve 120, and the downward pressure of the main spring 171, so that the damping force of the damper may be adjusted.

Therefore, in the compression stroke, a resultant force of the pressure for pushing the main poppet 140 upwards by the working fluid, the pressure of the compression pilot chamber 159, the downward pressure applied to the main poppet 140 according to the control current applied to the solenoid valve 120, and the downward pressure of the main spring 171 may act as the opening force of the main flow path.

As described above, the electronically controlled internal damper according to various embodiments of the present disclosure can be configured with a small number of components, and can be easily fastened only by the insertion into the inner housing 130 and the coaxial stacking, thus guaranteeing efficiency in manufacturing cost and manufacturing process.

Further, the pilot chamber can be formed according to the compression/tension stroke, and the damping force for each stroke can be controlled by controlling the pressure of the pilot chamber. In the compression stroke, the damping force can be simply adjusted only by the main spring 171.

Further, since the soft damping force may be adjusted merely by adjusting the elastic force of the plate-shaped valve 193 of the soft valve 190, it is possible to reduce power consumption according to the control of the solenoid valve 120.

Although all components constituting an embodiment of the present disclosure are described as being combined or operated as one, the present disclosure is not necessarily limited to these embodiments. That is, within the scope of the present disclosure, all of the components may be selectively combined and operated. Further, it should be understood that terms such as "comprise", "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added, unless otherwise stated. Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. An electronically controlled internal damper comprising:

an outer housing reciprocated in a cylinder and partitioning the cylinder into an upper chamber and a lower chamber;

an inner housing disposed inside the outer housing, and forming a main flow path which makes the upper chamber and the lower chamber of the cylinder communicate with each other;

a main poppet disposed in the inner housing to be movable up and down, thus opening or closing the main flow path; and a pilot poppet configured such that at least a portion thereof is accommodated in an upper portion of the main poppet, and configured to adjust an opening force of the main flow path according to a control current applied to a valve, wherein the main flow path is formed along an outer through hole formed in the outer housing and a first inner through hole formed at a height corresponding to that of the outer through hole in the inner housing, and is opened or closed depending on pressure at which the working fluid pushes the main poppet upwards.

2. The electronically controlled internal damper of claim 1, further comprising:

a main spring elastically supporting the main poppet downwards.

3. The electronically controlled internal damper of claim 1, further comprising:

a soft valve coupled to a lower portion of the outer housing.

4. The electronically controlled internal damper of claim 1, wherein a tension pilot chamber is formed between an inner circumference of the inner housing and a side of the main poppet, and the opening force of the main flow path is adjusted as the pilot poppet is moved up and down according to the control current, in a tension stroke.

5. The electronically controlled internal damper of claim 2, wherein a compression pilot chamber is formed in an upper portion of the pilot poppet, and the opening force of the main flow path is adjusted by at least one of a force supported by the main spring and a force supported by the pilot poppet according to the control current, in a compression stroke.

6. The electronically controlled internal damper of claim 1, further comprising:

a pilot spring disposed between the valve and the pilot poppet to elastically support the pilot poppet downwards.

7. The electronically controlled internal damper of claim 1, wherein the main poppet comprises a main poppet body in which an accommodating portion for accommodating the pilot poppet and a main-poppet flow path portion for defining a pilot flow path are formed, a main poppet jacket which extends from a lower end of the main poppet body to contact the inner circumference of the inner housing, and a working-fluid acting portion configured to be pressed by working fluid to open or close the main flow path.

8. The electronically controlled internal damper of claim 7, wherein the main-poppet flow path portion comprises a horizontal pilot flow path which communicates with the pilot chamber, a first vertical pilot flow path which is connected at a lower end thereof to the horizontal pilot flow path and is connected at an upper end thereof to the accommodating portion, and a second vertical pilot flow path which passes vertically through the main poppet body, and the first vertical pilot flow path communicates with the second vertical pilot flow path by pushing the pilot poppet upwards.

9. The electronically controlled internal damper of claim 8, wherein the pilot poppet comprises a plunger-rod support portion on which an end of the plunger rod of the valve is seated, and a guide flow path configured to allow the first vertical pilot flow path and the second vertical pilot flow path to communicate with each other.

10. The electronically controlled internal damper of claim 8, wherein a step is formed on the accommodating portion to protrude toward the pilot poppet along a circumference of an upper end of the first vertical pilot flow path.

11. The electronically controlled internal damper of claim 8, wherein a press surface is formed on a lower end of the pilot poppet such that upward pressure is exerted thereon by the working fluid in the tension stroke.

12. The electronically controlled internal damper of claim 7, wherein the working-fluid acting portion comprises a guide wall protruding downwards from the lower end of the main poppet, and a guide groove formed inside the guide wall in a radial direction thereof, and an outer circumference of the guide wall is pressed by the working fluid in the tension stroke, and the guide groove is pressed by the working fluid in the compression stroke.

13. The electronically controlled internal damper of claim 12, wherein the outer circumference of the guide wall is formed to slope upwards toward an outside in the radial direction.

* * * * *